RADIO PHASE-COMPARISON RECEIVERS

Filed Nov. 12, 1963 6 Sheets-Sheet 1

Charles Reginald Nowell Barnard

*Inventor*

By Moore, Hall & Pollock

*Attorney*

Charles Reginald Nowell Barnard
Inventor
By Moore, Hall & Pollock
Attorney

Oct. 17, 1967 C. R. N. BARNARD 3,348,225

RADIO PHASE-COMPARISON RECEIVERS

Filed Nov. 12, 1963

6 Sheets-Sheet 3

*Charles Reginald Nowell Barnard*

*Inventor*

By *Moore, Hall & Pollock*

*Attorney*

Charles Reginald Nowell Barnard
Inventor
By Moore, Hall & Pollock
Attorney

Charles Reginald Nowell Barnard
Inventor
By Moore, Hall & Pollock
Attorney

Oct. 17, 1967 C. R. N. BARNARD 3,348,225

RADIO PHASE-COMPARISON RECEIVERS

Filed Nov. 12, 1963 6 Sheets-Sheet 6

Charles Reginald Nowell Barnard
Inventor
By Mawhinney, Hall & Pollock
Attorney 3,348,225

RADIO PHASE-COMPARISON RECEIVERS

Charles Reginald Nowell Barnard, Farnborough, England, assignor to Minister of Aviation in Her Majesty's Government of the United Kingdom of Great Britain and Northern Ireland, London, England Filed Nov. 12, 1963, Ser. No. 323,002
13 Claims. (Cl. 343—112)

ABSTRACT OF THE DISCLOSURE

A radio phase-comparison receiver comprising a stable oscillator and a second and independent source of continuous wave signals having the same frequency as continuous wave signals derived from the oscillator. The phase of one of the signals is shifted in a predetermined manner and the two signals are then combined in a vectorial adder. The timing of the amplitude variation of the resulting output from the adder is compared with the timing of the phase shifts to yield a measure of the phase difference between the original signals.

Figure 1:
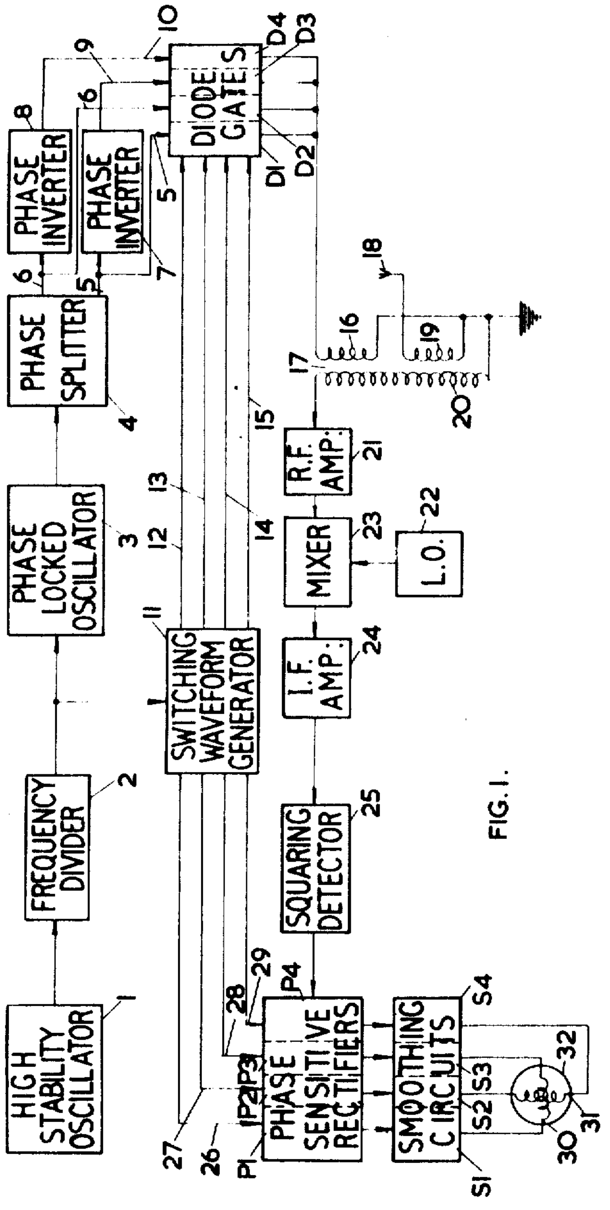

The present invention relates to radio phase-comparison receivers. Such receivers are used to compare the phase of a received radio-frequency signal (usually in the very low frequency range) with the phase of a signal derived from a stable oscillator. The phase information derived from a radio phase-comparison receiver may be used to monitor the phase and frequency of the stable oscillator or to control the stable oscillator so that it remains in a substantially constant phase relationship with the received signal.

Hitherto, phase-comparison receivers have comprised a radio-frequency amplifier, a mixer and a narrow-bandwidth intermediate-frequency amplifier, the phase comparison between the received signal and a locally generated signal being undertaken by suitable means wholly at the intermediate frequency. That is to say, the received signal is amplified in a narrow-bandwidth amplifier before any phase comparison takes place. Such amplifiers tend to introduce arbitrary and variable phase shifts. Because of this, great attention has to be given to the phase-stability of at least the intermediate-frequency amplifiers used in the receiver and the requisite stability is difficult to achieve.

A further use to which a phase-comparison receiver can be put is in navigational systems of the type in which the radial distance of a craft from a fixed transmitting station is obtained by continuously monitoring the phase of signals (in the very low radio-frequency range) received from the transmitting station relative to the phase of signals at the same frequency derived from a highly stable oscillator carried in the craft. Such a navigation system is described in British Patent No. 673,050.

One method of overcoming the problem of insufficient phase stability, in receivers employed in the above-described type of navigational system, is described in copending patent application No. 13,291/61. That method involves passing the received signals, and signals generated by a highly stable oscillator carried in the craft, through similar amplification and frequency-changing channels which are maintained at the same temperature in a temperature-controlled oven. This method, therefore, requires the duplication of expensive and bulky equipment.

It is an object of the present invention to provide a phase-comparison receiver in which the required phase comparison is achieved without the use of a receiving channel or receiving channels of such a high phase-stability.

According to the present invention, there is provided a phase-comparison receiver arranged to receive radio-frequency signals of the same frequency from an oscillator and from a second source, and including phase-shift means for varying the phase of one of the received signals. The other of the received signals is added vectorially to the phase-varied signal produced at the output of the phase-shift means, and the phase-difference between the received radio-frequency signals in extracted from the amplitude variation of the resulting signal.

According to a feature of the present invention there is provided a phase-comparison receiver including an adding circuit for adding vectorially radio-frequency signals applied thereto, means for applying signals received from an aerial system to the adding circuit, means for applying locally generated radio-frequency signals at the same frequency to the adding circuit, a waveform generator, phase-shift means for varying relatively under the control of the waveform generator the phases of one set of radio-frequency signals applied to the adding circuit, amplifying means for amplifying the output of the adding circuit, and phase-comparison means for comparing the relative phases of the resultant amplitude modulation at the output of the amplifying means and a waveform derived from the waveform generator. The locally generated signal may be derived from a highly stable oscillator. Alternatively, the phase comparison means may include a servo device, an output of which is fed back to an oscillator from which the locally generated signal is derived to keep the output of the oscillator in a substantially constant phase-relationship to the signals received from the aerial system.

Figure 2:
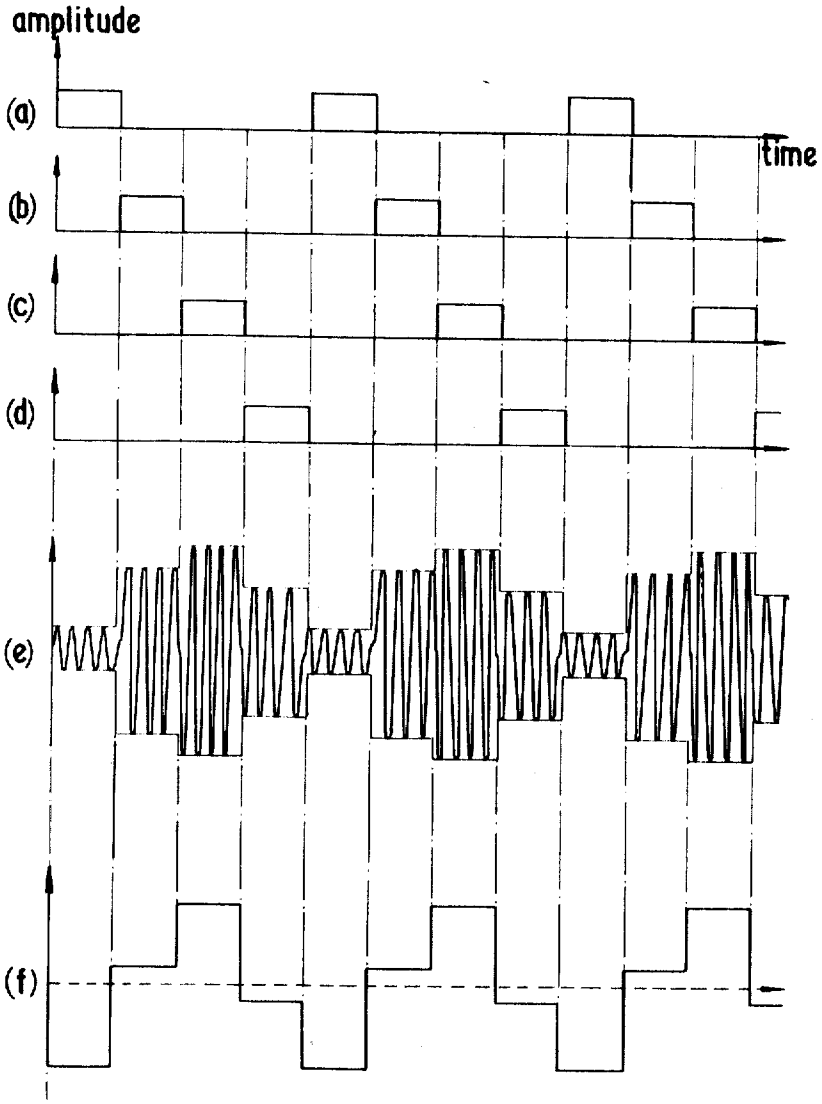
Figure 3:
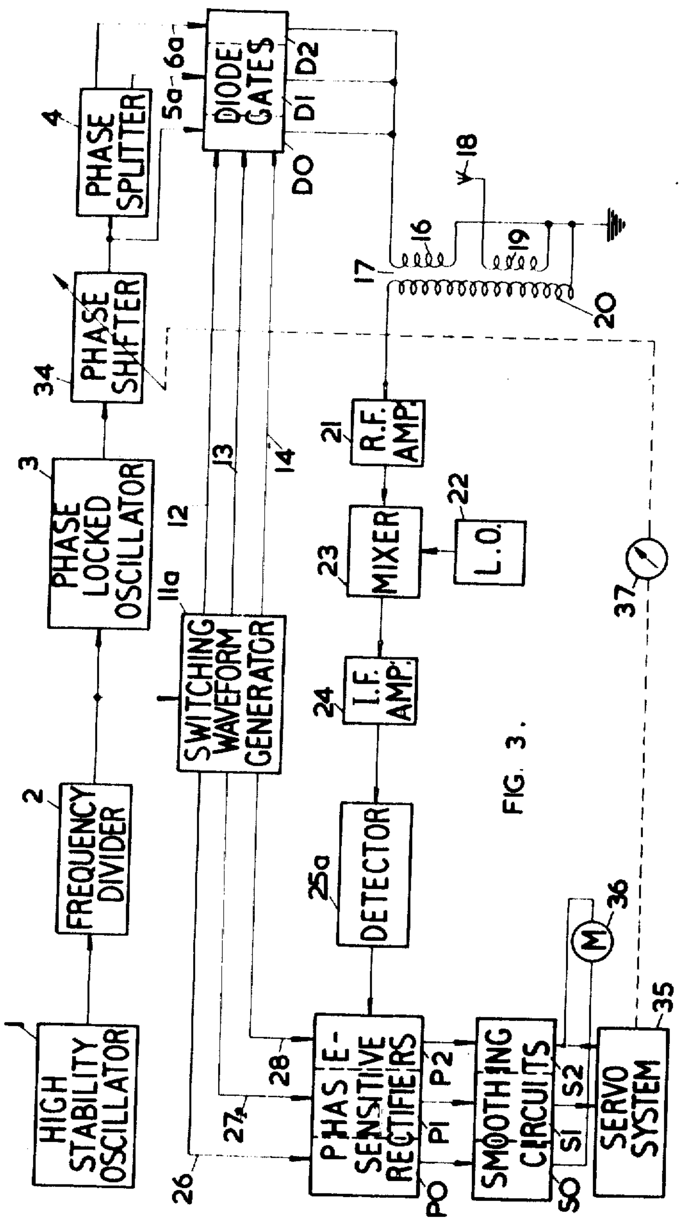
Figure 4:
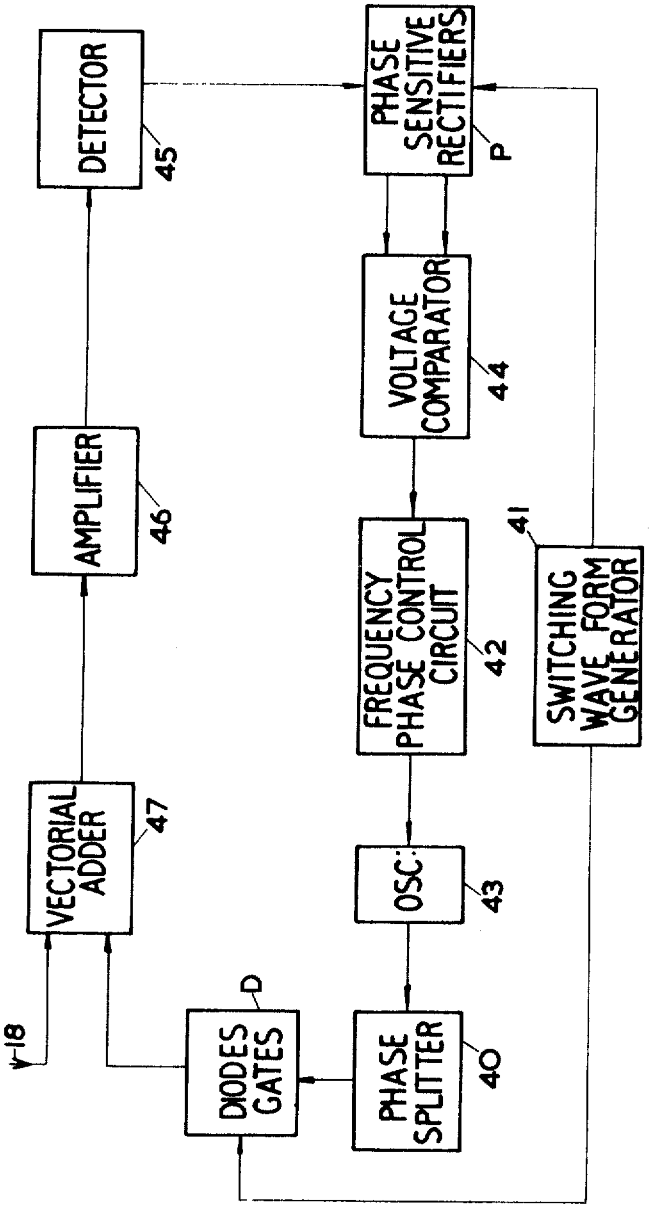
Figure 5:
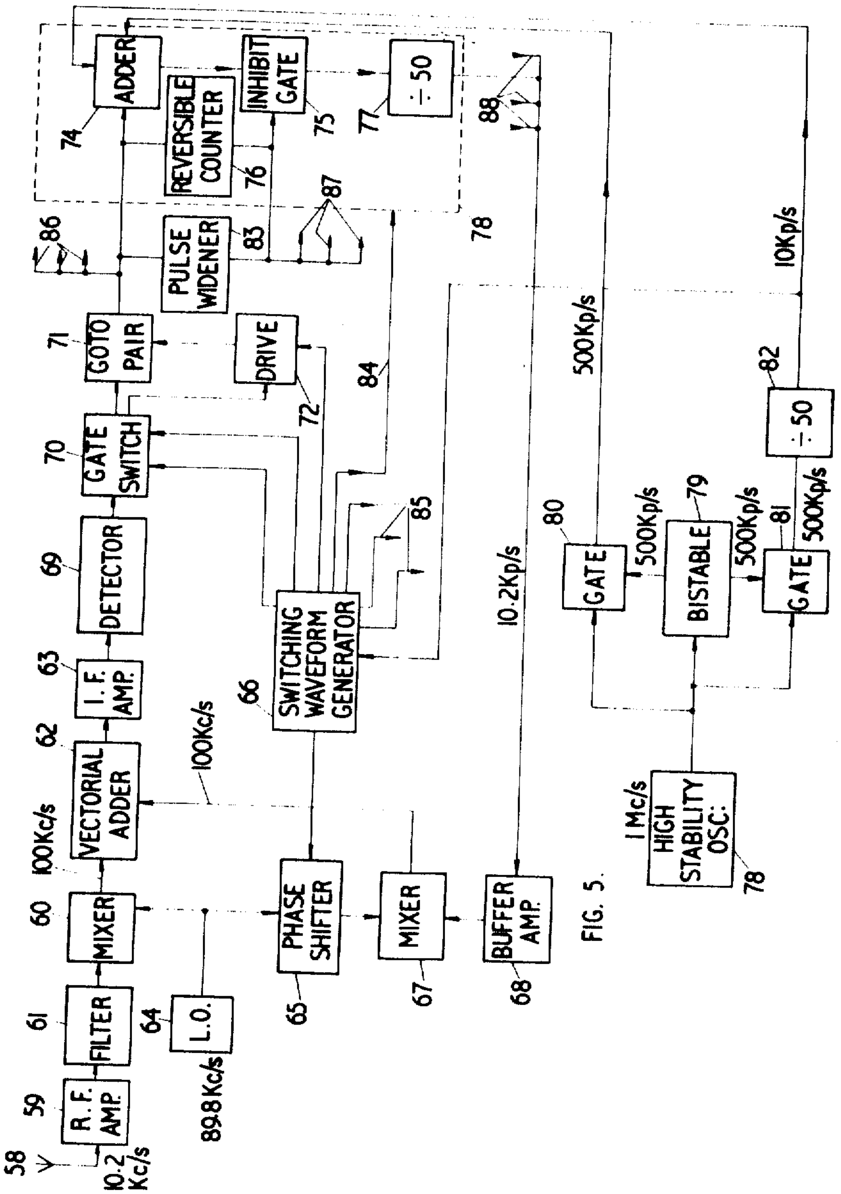
Figure 6:
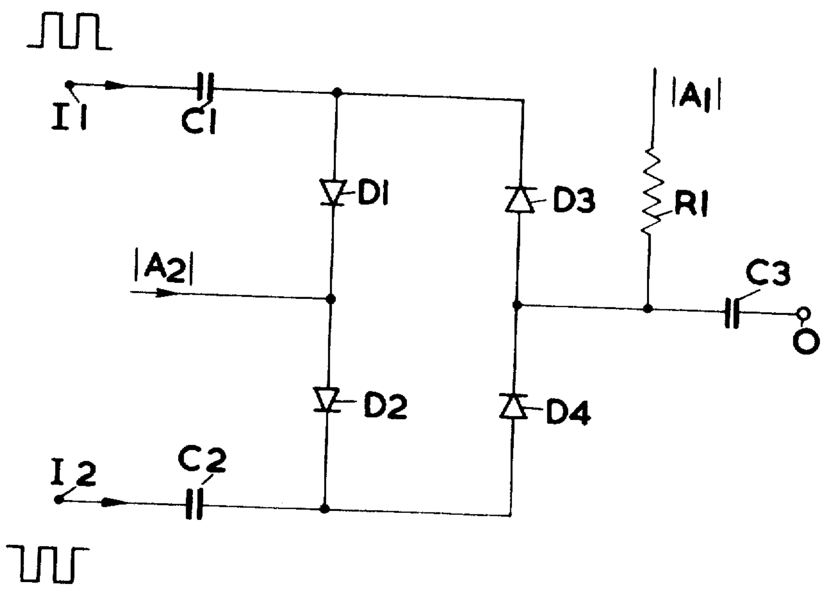

Embodiments of the present invention will now be described, by way of example, with reference to the accompanying drawings, in which;

FIGURE 1 is a block circuit diagram of a phase-comparison receiver,

FIGURE 2 is a series of graphical diagrams illustrating waveforms explanatory of the operation of the phase-comparison receiver shown in FIGURE 1, FIGURE 3 is a block circuit diagram of another arrangement of phase-comparison reecеiver, FIGURE 4 is a block circuit diagram of a phase-comparison receiver for controlling the phase of an oscillator by means of a received signal, FIGURE 5 is a block circuit diagram of another form of phase-comparison receiver, and FIGURE 6 is a circuit diagram illustrating in greater detail part of the circuit shown in FIGURE 5.

FIGURE 1 shows a high stability oscillator 1, the output from which is applied to a frequency divider 2. The oscillator 1 and the frequency divider 2 are so arranged that the output from the frequency divider 2 has a frequency of 100 cycles/sec. The output of the frequency divider 2 is connected to a phase-locked oscillator 3 which has an output frequency of 16 kilocycles/sec. accurately phase-locked to the output of the frequency divider 2. The output of the phase-locked oscillator 3 is applied to a phase-splitter 4 which provides two outputs 5 and 6 carrying signals in quadrature with one another. The outputs 5 and 6 are applied to two phase inverters 7 and 8 respectively which, in effect, shift the phases of their respective inputs by $\pi$ radians. The phase inverters 7 and 8 have outputs 9 and 10 respectively. The phase of the signal on the line 5 may be considered to be a datum phase of phase angle 0. The signal on the line 6, being in quadrature with the signal on the line 5, may be considered to have a phase of $\pi/2$ radians. The signal on the line 9, being in anti-phase with that on the line 5, may be considered to have a phase of $\pi$ radians. The signal on the line 10, being in anti-phase with that on the line 6, may be considered to have a phase of $3\pi/2$ radians. Thus the outputs 5, 6, 9 and 10 carry signals at the frequency of the oscillator 3, and these signals may be considered to have phase angles of 0, $\pi/2$, $\pi$ and $3\pi/2$ radians respectively. The outputs 5, 6, 9 and 10 are applied to diode gates D1, D2, D3 and D4 respectively.

The output of the frequency divider 2 is also applied to a switching waveform generator 11. This waveform generator generates four separate trains of pulses, each pulse being 10 milliseconds long. The pulse recurrence frequency of the pulses in each train is 25 pulses per second. The pulses in each train occur at different times from the pulses in any other train. Thus, each pulse in each train occurs immediately after a pulse in another of said trains. The four trains of pulses are shown diagrammatically in FIGURES 2(*a*), 2(*b*), 2(*c*) and 2(*d*). They issue from the waveform generator 11 on output lines 12, 13, 14 and 15 respectively. These output lines are applied to the diode gates D1, D2, D3 and D4 respectively to open these gates in sequence for 10 millisecond periods.

The outputs of the diode gates D1, D2, D3 and D4 are connected in parallel to a primary winding 16 of a radio-frequency transformer 17. The outputs on the lines 5, 6, 9 and 10 are thus applied sequentially to the primary winding 16 so that continuous wave signals having relative phases of 0, $\pi/2$, $\pi$ and $3\pi/2$ are applied to the primary winding 16 at times specified by the four trains of pulses, illustrated in FIGURES 2(*a*), 2(*b*), 2(*c*) and 2(*d*) respectively, from the waveform generator 11. A receiving aerial 18 is connected to a second primary winding 19 of the transformer 17. A secondary winding 20 of the transformer 17 is connected to a radio-frequency amplifier 21. The signal emerging from the radio-frequency amplifier 21 is heterodyned with a signal from a local oscillator 22 in a mixer 23, and the resulting intermediate frequency signal is amplified in an intermediate-frequency amplifier 24.

The output from the intermediate frequency amplifier 24 is applied to a squaring detector 25 of known form. This squaring detector provides an output voltage signal which has a value proportional to the square of the amplitude of the signal received from the intermediate-frequency amplifier 24. The output of the squaring detector 25 is applied in parallel to the inputs of four similar phase-sensitive detectors P1, P2, P3 and P4. Pulses derived on lines 26, 27, 28 and 29 from the switching waveform generator 11 are applied to the phase-sensitive rectifiers P1, P2, P3 and P4 respectively. The pulses on the lines 26, 27, 28 and 29 are similarly timed to the pulses on the lines 12, 13, 14 and 15, as shown at FIGURES 2(*a*), 2(*b*), 2(*c*) and 2(*d*) respectively. The outputs from the phase-sensitive detectors P1, P2, P3 and P4 are applied through four similar smoothing circuits S1, S2, S3 and S4 to orthogonal windings 30 and 31 of a phase meter 32 as shown.

The operation of the embodiment shown in FIGURE 1 will now be explained. Let it first be assumed that a continuous wave signal received at the aerial 18 from a ground transmitter has a stable frequency $f$ of 16 kc./s., this being the same as the continuous wave frequency of the phase-locked oscillator 3. Let it also be assumed that the signal received at the aerial 18 has a phase angle $2\alpha$ with respect to the signal on the output 5 applied to the diode gate D1, and that any signals generated in the secondary winding 20 of the transformer 17 due to signals in the primary windings 16 and 19 taken separately would be equal in amplitude, $V_0$. Now the transformer 17 acts as a vectorial adder for the two continuous wave signals applied to its primary windings 16 and 19. That is to say, the two rotating vectors representing the two signals are added vectorially so that, since they are of the same frequency, the amplitude of their resultant vector sum is dependent on their relative phase in the manner to be described hereinafter. A vectorial adder has a linear effect on each of its inputs and adds them vectorially. A vectorial adder should be distinguished from a mixer circuit which operates by providing a multiplication of its inputs and which, in similar circumstances, would give a D.C. level, a sum frequency and various other harmonic frequencies. Since in the present receiver a vectorial adder is used, it follows that the voltage $V_1$ generated in the secondary winding 20, and applied to radio-frequency amplifier 21 during a pulse in the train shown in FIGURE 2(*a*) can be expressed by an equation of the form $$V_1=V_0[\sin(wt.+\alpha)+\sin(wt.-\alpha)]$$

i.e.

$$V_1=2V_0.\sin wt.\cos\alpha \qquad (1)$$

where $w=2\pi f$ and $t$ represents time.

That is to say, the amplitude of the signal applied to the amplifier 21 is given by $$|V_1|=2V_0|\cos\alpha| \qquad (2)$$

This indicates that if the angle $\alpha$ varies linearly with time from 0 to $\pi$ radians, the voltage $V_1$ is amplitude varied in the form of a rectified sinusoid.

Thus, if the signal at the output 5 was applied continuously to the primary winding 16 and its phase was to be varied continuously in a linear manner, the amplitude envelope of the continuous wave signal at the output from the transformer 17 would be in the form of a rectified sinusoid. Furthermore, the phase of this rectified sinusoid in relation to the timing in the variation in phase of the signal on the output line 5 would be a measure of the difference in phase between the signal received at the primary winding 19 and a datum phase of the output on the output line 5. In the present embodiment, however, the phase of the signal on the output line 5 does not vary and is treated as the datum phase. Instead, the phase of the signal applied to the primary winding 16 is varied discontinuously in discrete steps under the control of the waveform generator 11. Therefore, the amplitude envelope at the output of the transformer 17 will also be discontinuous but will have a phase relative to the timing of the gates D1 to D4 which is a measure of the phase angle $2\alpha$ between the phase of the signal at the output 5 and the phase of the signal received at the primary winding 19. It follows that the phase of the amplitude envelope at the output from the transformer 17 resulting from the vector addition of the waveform applied to the primary winding and the succession of signals from the gates D1 to D4 in the transformer 17, in relation to the timing of the opening of the gates D1 to D4 (and, therefore, in relation to the timing of the pulses on the lines 12 to 15 from the switching waveform generator 11) is a measure of the angle $\alpha$.

Thus it may be shown that the amplitudes $|V2|$, $|V3|$ and $|V4|$ of continuous wave signals applied to the radio frequency amplifier 21 during immediately succeeding pulses in the pulse trains shown in FIGURES 2(*b*), 2(*c*) and 2(*d*), assuming the phase angle $\alpha$ has remained the same, are given by the equations:

$$|V_2|=2V_0|\cos(\alpha+\pi/4)| \qquad (3)$$
$$|V_3|=2V_0|\cos(\alpha+\pi/2)| \qquad (4)$$
$$|V_4|=2V_0|\cos(\alpha+3\pi/4)| \qquad (5)$$

A typical example of the signal applied to the radio-frequency amplifier 21, corresponding in time to the waveforms shown in FIGURES 2(*a*) to 2(*d*), is shown in FIGURE 2(*e*). It will, of course, be realised that FIGURE 2(*e*) is purely diagrammatic in form and that, for example, the sinusoidal waves shown therein are purely illustrative, their actual frequency being much higher than that implied by the drawing. It is the phase of the amplitude outline of the continuous waveform shown in FIGURE 2(*e*) in relation to the timing of the pulses shown in FIGURES 2(*a*) to 2(*d*) which is a measure of the phase difference $2\alpha$ between the signal at the output 5 and the signal applied to the aerial 18.

The radio-frequency signal illustrated in FIGURE 2(*e*) is applied to the radio-frequency amplifier 21 and amplified therein, whereafter it is frequency-shifted in the mixer 23 and amplified by the intermediate-frequency amplifier 24, the relative amplitudes of the various parts of the signal being maintained throughout this process. The output from the amplifier 24 is detected by the squaring detector 25 which gives an output proportional to the square of the amplitude of its input signals. It may be shown that the output voltage $V_1'$, with the purely D.C. component removed, of the squaring detector 25 corresponding to the voltage amplitude $|V_1|$ of Equation 2 above is given by:

$$V_1'=k.V_0^2.\ \cos 2\alpha \qquad (6)$$

where $k$ is a circuit parameter which may be considered to be constant.

Similarly the output voltages $V_2'$, $V_3'$ and $V_4'$, with the purely D.C. component removed, of the squaring detector 25 corresponding to the voltage amplitude $|V_2|$, $|V_3|$ and $|V_4|$ of Equations 3, 4 and 5 respectively are given by:

$$V_2'=k.V_0^2 \cos (2\alpha+\pi/2)=-k.V_0^2.\ \sin 2\alpha \qquad (7)$$

$$V_3'=k.V_0^2 \cos (2\alpha+\pi)=-k.V_0^2.\ \cos 2\alpha \qquad (8)$$

and $$V_4'=k.V_0^2.\ \cos (2\alpha+3\pi/2)=k.V_0^2.\ \sin 2\alpha \qquad (9)$$

The voltages $V_1'$, $V_2'$, $V_3'$ and $V_4'$ occur in sequence, as indicated in FIGURE 2(*f*), and are applied from the squaring detector 25 to the phase-sensitive rectifiers P1, P2, P3 and P4 in parallel. The phase-sensitive rectifiers P1, P2, P3 and P4 have pulses similarly timed to those shown in FIGURES 2(*a*), 2(*b*), 2(*c*) and 2(*d*) respectively applied to them so that voltages proportional to $V_1'$, $V_2'$, $V_3'$ and $V_4'$ respectively appear at their outputs. These voltages are smoothed in the smoothing circuits S1, S2, S3 and S4 respectively. The outputs of the smoothing circuits S1 and S3 are applied to the two ends of the winding 30 of the phase-meter 32. Therefore, the current through the winding 30 will be proportional to $V_1'-V_3'$. Similarly, the outputs of the smoothing circuits S2 and S4 are applied to the two ends of the winding 31 of the phase-meter 32. The current through the winding 31 will be similarly proportional to $V_4'-V_2'$. It follows that the deflection, $\theta$, of the phase-meter 32 is given by the expression $$\theta=\tan'(V_4'-V_2')/(V_1'-V_3')$$

That is to say, $\theta=\tan^{-1}(\sin 2\alpha/\cos Z\alpha)$.

Therefore:

$$\theta=2\alpha \qquad (10)$$

It will be seen from the above description that the function of the phase sensitive rectifiers P1 to P4, the smoothing circuits S1 to S4 and the phase meter 32 is to measure the phase of the amplitude variation, resultant from the vector addition of the two signals applied to the transformer 17, relative to the timing of the waveform generator 11.

The difference in phase between the signal at the output of the oscillator 3 and the signal on the output 5 of the phase-splitter 4 has, of course, a known constant value.

In the foregoing mathematical analysis, demonstrating that the deflection $\theta$ of the phase-meter 32 represents the phase-difference $2\alpha$ between the signal received at the aerial 18 and the signal at the output 5 from the phase-splitter 4, it was assumed that the amplitudes of the two signals, as seen by the secondary winding 20 of the transformer 17, were the same. In practice, the amplitudes of the two signals need not be the same and, for example, the signal induced in the secondary winding 20 due to the signal in the primary winding 16 may be greater in amplitude than that induced by the signal in the primary winding 19. The effect of such an inequality in amplitude is merely to provide additional D.C. components in the outputs of the phase-sensitive rectifiers P1, P2, P3 and P4. These D.C. components are all of the same magnitude and duly cancel one another in the phase-meter 32. Of course, the inequality in amplitude should not be such as unduly to dull the sensitivity of the phase-meter.

The above-described embodiment is suitable for use in a navigational system in which the phase-meter 32 indicates the fractional part of the number of wavelengths that a craft carrying the apparatus is distant from a ground transmitting station transmitting a carrier wave at a frequency *f*. By continuously monitoring the indication of the phase-meter 32, any change in distance from the ground transmitting station may, therefore, be computed. The embodiment described with reference to FIGURE 1 may be modified to extract similar information from transmissions at the same frequency transmitted and received in time-division multiplex from two or more spaced ground transmitting stations. In this case, the switching waveform generator 11 must be synchronised in known manner to the time-division multiplex transmissions. Further, the block of smoothing circuits S1 to S4 and their associated phase-meter 32 must be replicated so as to correspond to the number of ground transmitting stations. The outputs of the phase-sensitive rectifiers P1 to P4 are then switched by the switching waveform generator 11 to the appropriate block of smoothing circuits corresponding to the transmitting station that is being received. The switching of the diode gates D1 to D4, and the waveforms supplied to the phase-sensitive rectifiers P1 to P4, may be such that all four outputs proportional to the voltages $V_1'$ to $V_4'$ are obtained from the phase-sensitive rectifiers P1 to P4 respectively during each received transmission from each ground station. Alternatively, the switching of the diode gates D1 to D4, and the waveforms supplied to the phase-sensitive rectifiers P1 to P4, may be such that a separate one of the outputs proportional to the voltages $V_1'$ to $V_4'$ is obtained during each transmission from a ground station. In this latter instance, it takes four successive transmissions from the same ground station to obtain all four of the outputs proportional to the voltages $V_1'$ to $V_4'$ relating to that station.

FIGURE 3 is a diagram of a further modification of the embodiment described with reference to FIGURE 1. In FIGURE 3, components similar in function to those shown in FIGURE 1 bear the same reference numerals and letters. FIGURE 3 shows a high stability oscillator 1, the output of which is applied to a frequency divider 2 which provides an output frequency of 100 cycles/sec. A phase-locked oscillator 3 having an output frequency of 16 kilocycles/sec. is locked in phase to the output of the frequency divider 2. The output of the phase-locked oscillator 3 is connected to a variable phase-shifter 34. This phase-shifter may take the form of a goniometer. The output of the phase-shifter 34 is applied to a diode gate D0 and also to a phase-splitter 4. One output of the phase-splitter 4 is applied to a diode gate D1 via a line **5*a*. The other output of the phase-splitter 4 is applied to a diode gate D2 via a line 6*a***.

The diode gates D0, D1 and D2 are arranged to be opened in turn by pulses on lines 12, 13 and 14 from a switching waveform generator **11*a***. These pulses are similar to those described with reference to FIGURES 2(*a*), 2(*b*) and 2(*c*) except that, in the modification of FIGURE 3, pulses of the type shown in FIGURE 2(*a*) follow immediately after pulses of the type shown in FIGURE 2(*c*), with pulses of the type shown in FIGURE 2(*d*) being omitted from the sequence. The outputs from the diode gates D0, D1 and D2 are applied in parallel to the primary winding 16 of a transformer 17. An aerial 18 is connected to a primary winding 19 of the transformer 17. A secondary winding 20 of the transformer 17 is connected to a radio-frequency amplifier 21. The output signal from the radio-frequency amplifier is heterodyned in a mixer 23 with the output of a local oscillator 22, and the resulting signal is amplified in an intermediate-frequency amplifier 24 and then detected in a detector **25*a***.

The output of the detector **25*a* is applied to three phase-sensitive rectifiers P0, P1 and P2 in parallel. Output pulses are applied from the switching waveform generator 11a on lines 26, 27 and 28 to the phase-sensitive rectifiers P0, P1 and P2 respectively. The pulses on the lines 26, 27 and 28 are similar in nature, and are similarly timed, to those on the lines 12, 13 and 14 respectively. The outputs of the phase-sensitive rectifiers P0, P1 and P2 are applied to three smoothing circuits S0, S1 and S2 respectively. The outputs of the smoothing circuits S1 and S2 are connected to a servo system 35 which has an output shaft which adjusts (for example, by rotating a goniometer shaft) the phase-shift produced by the phase-shifter 34 until the input voltages to the servo system are equal. The output shaft also drives a pointer on a scale 37. The outputs of the smoothing circuits S0 and S2 are connected to the inputs of a meter 36**.

In considering the operation of the embodiment described with reference to FIGURE 3, let it first be assumed that the detector 25a is a squaring detector like the detector 25 shown in FIGURE 1. Let it also be assumed that the signal received at the aerial 18 has a phase angle $2a$ with respect to the signal on the line 5a. Then, if the relative amplitudes of the signals are as initially described for the embodiment shown in FIGURE 1, the output voltages of the smoothing circuits S1 and S2 will be proportional to the voltages $V_1'$ and $V_2'$ respectively given in Equations 6 and 7 above. The servo system 35 adjusts the phase-shift, $\theta$, introduced by the phase-shifter 34 until the voltages $V_1$ and $V_2'$ are equal. This can occur only if the phase-angle $2a$, between the signal on the line 5a and the signal at the aerial 18, is minus $\pi/4$ radians. Therefore, any change in the phase angle $\theta$ introduced by the phase-shifter 34 is always made equal to any change in the phase-difference between the output signal from the phase-locked oscillator 3 and the signal received at the aerial 18. The change in phase angle $\theta$ can be made equal to the change in the angle of rotation of the shaft of the servo system 35, and this change in angle is indicated by the pointer on the scale 37. Clearly, by making due allowance for the known constant phase-change in the phase-splitter 4 between its input and its output on the line 5a, the pointer on the scale 37 can be made to indicate directly the difference in phase between the received signal at the aerial 18 and the output signal from the phase-locked oscillator 3.

The phase splitter 4 is a bridge type of phase-splitter which provides output signals phase-shifted from its input signal by $-\pi/4$ radians and $+\pi/4$ radians on the lines 5a and 6a respectively. It follows that the output signal from the phase-shifter 34 and, therefore, the input signal to the diode gate D0, leads the signal on the line 5a by $\pi/4$ radians in phase. The signal on the line 5a has already been considered to have a relatively zero phase angle. It follows that the amplitude $|V_5|$ of the input signal, to the radio-frequency amplifier 21, when the diode gate D0 is open, is given by the equation:

$$|V_5| = 2V_0| \cos (a + \pi/8)|$$

Thus, when the diode gate D0 is open, the output $V_5$ of the detector 25a, neglecting the purely D.C. component, is given by the equation $$V_5' = k.V_0^2. \cos (2\alpha + \pi/4)$$

It has been shown that, with the phase-shifter 34 correctly adjusted by the servo system 35, the phase angle $2\alpha = -\pi/4$. Therefore, $$V_5' = k.V_0^2. \cos 0 = k.V_0^2$$

However, under the same conditions, the output $V_2'$ of the detector 25a when the diode gate D2 is open is given by Equation 7 above. That is to say:

$$V_2' = -k.V_0^2. \sin 2\alpha = k.V_0^2. \sin (-\pi/4)$$
$$= k.V_0^2(1/\sqrt{2})$$

Therefore, when a signal is present at the aerial 18 and when the phase-shifter 34 is correctly adjusted, there will always be a difference in level in the outputs of the smoothing circuits S0 and S2. This difference is shown on the meter 36. However, when no signal is present on the aerial 18, the voltages $V_2'$ and $V_5'$ will be equal and the meter reading will be zero. Thus, the meter 36 provides an indication that a signal is being received at the aerial 18.

Hitherto it has been assumed, for convenience, that the detector 25a is a squaring detector. However, since the embodiment described with reference to FIGURE 3 employs a null method of obtaining the phase difference, the detector 25a need not be a squaring detector but may be a detector such as is used in normal amplitude modulation receivers. It may be shown that the meter 36 may still be used to indicate the presence of a signal at the aerial 18.

It will be apparent to those versed in the art that the high stability oscillator 1 and the frequency divider 2 are not essential to the invention, and are provided only to stabilize the phase of the oscillator 3. Clearly the switching waveform generator 11 (FIGURE 1) or 11a (FIGURE 3) may be synchronised with another source or may, in suitable cases, be self-running. The phase-locked oscillator 3 may be replaced by an oscillator the frequency and phase of which are controlled by the phase-measurement made by the phase-comparison receiver. Thus, for example, the embodiment described with reference to FIGURE 3, may be adapted to control the frequency and phase of an oscillator in relation to a signal received at the aerial 18. For this purpose the phase-shifter 34 is removed, and the outputs of the smoothing circuits S1 and S2 are fed to a voltage comparator which controls directly the frequency and phase of the oscillator. The essential features of such an arrangement are shown diagrammatically in FIGURE 4.

FIGURE 4 shows an aerial 18 feeding one input of a vectorial adder 47 which may, for example, be similar to the transformer 17 of FIGURE 3. The output of the vectorial adder is amplified in an amplifier 46 and detected in a detector 45 in a manner similar to that described with reference to FIGURE 3. The output of the detector 45 is applied to phase sensitive rectifiers P which are supplied with appropriate waveforms from a switching waveform generator 41. Output voltages from the phase-sensitive rectifiers P, similar to the voltages $V_1^1$ and $V_2^1$, derived as hereinbefore described with reference to FIGURES 1 and 2, are applied to a voltage comparator 44; and the difference voltage is applied to a frequency and phase control circuit 42 of an oscillator 43. The output of the oscillator 43 is applied to a phase-splitter 40, the outputs of which are applied to diode gates D as in the embodiment described with reference to FIGURE 3. The diode gates are controlled by outputs from the switching waveform generator 41. The combined outputs of the diode gates D are applied to a second input of the adder 47.

The operation of the embodiment shown in FIGURE 4 is similar to that of the embodiment shown in FIGURE 3, except that the frequency and phase of the oscillator 43 is controlled directly so that its frequency of oscillation is the same as that of the signal received at the aerial 18 and has a substantially constant phase relationship to the received signal. A meter, similar to the meter 36 shown in FIGURE 3, may also be provided to indicate the presence of a received signal.

It will be apparent that the hereinbefore described embodiments are given by way of example only, and that many variations of these embodiments will occur to those versed in the art. For example, the transformer 17 of FIGURE 1 or 3 may be replaced by any circuit capable of adding two radio-frequency signals vectorially. Such a circuit may, for example, consist of two triode valves having a common anode load, the control grid of each valve being fed with a separate one of the signals to be added.

Although, in the above-described embodiments, the phase of locally generated signals fed to the adding circuit (for example, the transformer 17 of FIGURES 1 and 3), has to be effectively changed by means of the diode gates D, clearly the phase of the signal received at the aerial 18 may be changed in a similar manner to obtain the required amplitude variation in combination with the locally generated signal. Furthermore, although in the embodiment described with reference to FIGURE 1, the phases of the locally generated signal applied to the transformer 17 have been changed in discrete steps by means of the diode gates D and their associated phasing circuits, the phase of the signal may be changed continuously by, for example, a goniometer. In this case, as will be seen from Equation 2 above, the output from the transformer 17 will bear an amplitude variation generated as the angle $\alpha$ varies. The phase of this amplitude variation, relative to the rotational position of the goniometer shaft causing the relative phase change between the two signals applied to the transformer 17, will then be indicative of the relative phases of the oscillator 3 and the signal received at the aerial 18. A suitable modification of the embodiment shown in FIGURE 1 to carry this into effect, would be to dispense with the waveform generator 11, the phase inverters 7 and 8, the diode gates D1 to D4, the phase-sensitive rectifiers P1 to P4, the smoothing circuits S1 to S4 and the phase-meter 32. The lines 5 and 6 at the output of the phase-splitter 4 would be connected to the input of a goniometer, the shaft of which would be rotated continuously. The output of the goniometer would be connected to primary winding 16 of the transformer 17. The shaft of the goniometer would be arranged to drive a sine potentiometer, and the phases of the output of this potentiometer and of the detector 25 would then be compared to give the required radio-frequency phase difference.

FIGURE 5 is an embodiment of the invention which is suitable for use in conjunction with a number of signals received in time-division multiplex on the same frequency. FIGURE 5 shows an aerial 58 feeding a broad-bandwidth radio-frequency amplifier 59. The radio-frequency amplifier 59 feeds a mixer 60 through a broad-bandwidth radio-frequency filter 61. The output of the mixer 60 is applied to one input of a vectorial adder 62, the output of which is connected through an intermediate-frequency amplifier 63 to a linear detector 69. The mixer 60 is also fed from a local oscillator 64. The local oscillator 64 also feeds a phase-shifter 65, the phase-shift in which is controlled by a switching waveform generator 66 in a manner to be described hereinafter. The output of the phase-shifter 65 is applied to one input of a mixer 67, the output of which is applied to another input of the vectorial adder 62. A reference frequency signal is applied to the other input of the mixer 67 from a buffer amplifier 68.

The linear detector 69 has its output connected to a gate switch 70 comprised of two phase-sensitive rectifiers similar to any two of those shown at P1 to P4 in FIGURE 1. This gate switch is under the control of the switching waveform generator 66. The gate switch 70 has two outputs, one of which is connected to the input of a Goto pair 71 of Esaki diodes and the other of which is connected to a drive circuit 72 which is arranged to drive the Goto pair. This other output of the gate switch 70 sets the voltage level about which the drive circuit operates.

The output of the Goto pair 71 is applied directly, and also through a pulse widener 83, to a number of pulse control and counter circuits in time division multiplex under the control of the switching waveform generator 66. One of these pulse control and counter circuits, of known form, is shown at 73. It comprises an adder 74, an inhibit gate 75, a reversible counter 76 and a divider circuit 77. The output of the divider circuit 77 is applied, in time division multiplex with signals from other control and counter circuits (not shown), to the buffer amplifier 68.

The adder 74 has three inputs; one of these inputs is derived from the Goto pair and the other two are derived from a high-stability oscillator 78, having an output frequency of 1 mc./s., in the following manner. The output of the high-stability oscillator 78 is applied to a bistable circuit 79 which is arranged to change its state every cycle of the output of the oscillator 78. The bistable circuit 79 is connected to two gates 80 and 81 so that these gates are opened alternately to let through pulses from the oscillator 78 at a recurrence frequency of half the oscillator frequency. The outputs from the gates 80 and 81 are two interdigitated pulse trains each having a pulse recurrence frequency of 500 kilopulses per second. The output of the gate 80 is applied directly to the adder 74 whilst the output of the gate 81 is applied to the adder 74 through a divider circuit 82 which reduces the pulse recurrence frequency to 10 kilopulses per second. The pulse recurrence frequency at the output of the adder 74 when there is no effective output from the Goto pair 71 is, therefore, 510 kilopulses/sec. This is divided by the divider circuit 77 to provide an output therefrom of 10.2 kilopulses/sec. This output is converted by the buffer amplifier 68 into sinusoidal oscillations having a frequency of 10.2 kc./s. The output of the divider 82 is also applied to switching waveform generator 66 in order to synchronize this generator.

The operation of the circuit shown in FIGURE 5 is as follows. The aerial 58 receives an incoming signal at a frequency of 10.2 kc./s. which is amplified and filtered by the radio-frequency amplifier 59 and the filter 61 respectively. This incoming signal may be from a number of different sources in time-division multiplex, but for the immediately following description it will be considered to be continuous from one source. The amplified and filtered signal is combined in the mixer 60 with a signal, at a frequency of 89.8 kc./s., from the local oscillator 64. The output signals from the mixer 60, which include signals at the sum frequency of 100 kc./s., is applied to the vectorial adder 62. The phase shifter 65 shifts the phase of the output of the local oscillator 64 by zero radians and $\pi$ radians alternately, and applies this phase-shifted output to the mixer 67 where it is mixed with the output, of 10.2 kc./s. frequency, of the buffer amplifier 68. The output of the mixer 67, which includes signals at the sum frequency of 100 kc./s., is applied to the other input of the vectorial adder 62. In the vectorial adder 62, the two signals of 100 kc./s. frequency are added to provide alternately signals having amplitudes of the form $$|A_1|=|V+v \sin 2\alpha| \text{ and } |A_2|=|V-v \sin 2\alpha|$$

where $|V|$ is the amplitude of the reference vector, $|v \sin 2\alpha|$ is the amplitude of the signal vector, and $2\alpha$ is the phase-difference between the reference oscillation and the incoming signal. These signals are amplified and detected in the amplifier 63 and the detector 69 respectively. They are then separated out by the gate switch 70 for application to the Goto pair 71 and the drive circuit 72 respectively. The amplitudes $|A_1|$ and $|A_2|$ are compared by the Goto pair 71 so that a positive pulse issues therefrom if $|A_1|$ is greater than $|A_2|$ and a negative pulse issues therefrom if $|A_1|$ is less than $|A_2|$. It will be seen that the detector 69, the gate switch 70 and the Goto pair 71 act as a means of phase comparison between the signals of amplitudes $|A_1|$ and $|A_2|$ and the timing of the signal from the waveform generator 66 which drives the Goto pair 71. Thus, if the amplitude $|A_1|$ is greater than the amplitude $|A_2|$ the signal from the vectorial adder 62 may be considered to be in one phase relative to the timing of the waveform generator 66, and if the amplitude $|A_1|$ is less than the amplitude $|A_2|$ the signal from the vectorial adder 62 may be considered to be in an opposite phase relative to the timing of the waveform generator 66. If $|A_1|$ equals $|A_2|$ the signal from the vectorial adder 62 may be considered to be in phase with the waveform generator 66. The timing of the drive to the Goto pair is arranged to be such that any pulse produced by the Goto pair occurs, in time, between other pulses applied to the adder 74. When the output pulse with the waveform generator. The timing of the drive of Goto pair 71 is positive, it adds a pulse to the output of the adder 74, thus advancing the phase of the signal issuing from the divider 77. The positive pulse will also subtract unity from the reading of the counter 76. When, however, the pulse produced from the Goto pair 71 is negative, it is widened by the pulse widener 83 to embrace the next pulse issuing from the adder 74. This widened pulse is applied to the inhibit gate 75 so as to prevent one pulse from passing therethrough. In consequence the output of the divider 77 is retarded. Unity is also added to the reading of the reversible counter 76.

In the circumstances where the amplitudes $|A_1|$ and $|A_2|$ are approximately equal, alternate positive and negative pulses will issue from the Goto pair 71 so that, over a period of time, the phase change in the output of the divider 77 will be effectively zero. However, if the phase of the signal received at the aerial 58 is changing, then either the amplitude $|A_1|$ will become greater than the amplitude $|A_2|$ or vice versa. In that case, the phase of the output of the divider 77 and, therefore, of the amplifier 68, will be made to change so as to bring $|A_1|$ and $|A_2|$ into equality. At the same time, the counter 76 will record the phase change in the signal received at the aerial 58.

So far in the description, it has been assumed that a single signal is received at the aerial 58. However, a number of signals of the same frequency may be received by the aerial 58 in time-division multiplex. In that case the switching waveform generator 66 will be sufficiently synchronised to the incoming signals so that a different pulse control and counter circuit (such as that illustrated at 73) is switched into the remainder of the circuit for each different received signal. In FIGURE 5, the multiplexing control function of the switching waveform generator 66 is indicated by the line 84 and the arrows 85. Likewise, the inputs to the different pulse control and counter circuits are indicated by arrows 86 and 87, and the outputs of the different pulse control and counter circuits are indicated by arrows 88. It is these inputs and outputs which are switched to the remainder of the circuit by the switching waveform generator 66.

FIGURE 6 shows a diagram of a circuit making up the Goto pair 71 and the drive circuit 72 of FIGURE 5. The drive circuit 72 comprises two capacitors C1 and C2 and two D.C. restoring diodes D1 and D2, and the Goto pair circuit comprises two Esaki or tunnel diodes D3 and D4.

The operation of this circuit will now be briefly described. The signal amplitude $|A_2|$ derived from the gate switch 70 (FIGURE 5) is applied to the junction of the diodes D1 and D2. Two pulse trains from the switching waveform generator 66 are applied one to each of two inputs I1 and I2 of the capacitors C1 and C2 respectively. Positive-going pulses of one train occur simultaneously with negative-going pulses in the other as indicated in FIGURE 6. The diodes D1 and D2 act upon these pulse trains so that they are applied in push-pull to the Esaki diodes D3 and D4 about a mean level set by the amplitude $|A_2|$. A signal proportional to the amplitude $|A_1|$ is applied through a resistor R1 to the junction of the Esaki diodes D3 and D4. A positive or negative pulse will then be generated at the junction of the Esaki diodes D3 and D4 according to whether the amplitude $|A_1|$ is greater than or less than the amplitude $|A_2|$. Such a pulse is transmitted to an output O of the circuit through a capacitor C3. It should be noted that in order for signals proportional to $|A_1|$ and $|A_2|$ to be present simultaneously at the junctions of the diodes D3 and D4, and D1 and D2 respectively, a filter circuit to store one of its outputs should be provided in the output circuits of the gate switch 70 (FIGURE 5).

It will be clear to those versed in the art that although in the above-described embodiments it is the locally generated signal which is phase-shifted, the other signal may equally well be phase-shifted under the control of the waveform generator, or, alternatively, both of the signals may be so phase-shifted. However, it is preferable to shift the phase of the locally generated signal because phase-shifting the weaker signal would introduce an undesirable amount of noise into the system.

I claim:

1. A radio phase-comparison receiver comprising a source of continuous wave signals, a stable oscillator independent of said source, means connected to said stable oscillator for deriving therefrom continuous wave signals of the same frequency as continuous wave signals from said source, phase shift means connected to receive one of said signals for varying the phase of said one of said signals, vectorial adder means connected to said phase shift means and to receive the other of said signals for adding vectorially the said other of said signals to the phase-varied signal to produce a resultant continuous wave signal the amplitude of which is varied due to the phase variations of the phase-varied signal, a waveform generator connected to control said phase shift means, and phase comparison means operatively connected to the output of said vectorial adder and to said waveform generator for comparing the phase of the said resultant amplitude varied continuous wave signal with the timing of said waveform generator.

2. A radio phase-comparison receiver as claimed in claim 1 wherein said adder means comprises a transformer having a first primary winding to which the phase-varied signal is applied and a second primary winding to which the other received signal is applied.

3. A radio phase-comparison receiver as claimed in claim 2 wherein said phase-shift means comprises means for varying the phase of the said one of the received signals in discrete ninety-degree steps.

4. A radio phase-comparison receiver as claimed in claim 3 including an intermediate-frequency amplifier interposed between said adder means and said phase-comparison means.

5. A radio phase-comparison receiver as claimed in claim 4 wherein said waveform generator is connected to synchronised with said oscillator.

6. A radio phase-comparison receiver as claimed in claim 5 wherein said phase-comparison means includes phase-sensitive rectifiers equal in number to the number of different phase-shifts introduced by said phase-shift means, and means for comparing the outputs of pairs of said phase-sensitive rectifiers.

7. A radio phase-comparison receiver as claimed in claim 1 including a servo system connected to said phase-comparison means, a variable phase-shifter connected to said servo system and connected initially to control the phase of one of the received signals, said servo system being operative to control said variable phase-shifter whereby said two received signals are maintained in a substantially constant phase relationship to one another.

8. A radio phase-comparison receiver as claimed in claim 1 wherein said phase-shift means comprises means for varying the phase of one of said signals in discrete ninety-degrees steps.

9. A radio phase-comparison receiver as claimed in claim 8 and wherein said phase-comparison means comprises phase-sensitive rectifiers equal in number to the number of different phase-shifts introduced by said phase-shift means, and means for comparing outputs of pairs of said phase-sensitive rectifiers.

10. A radio phase-comparison receiver including an adding circuit for adding vectorially radio frequency signals applied thereto, an aerial system, means for applying a set of signals received by said aerial system to said adding circuit, means for generating a set of local signals of the same frequency as those applied to said adding circuit from said aerial system, means for applying said set of local signals to said adding circuit, a waveform generator, phase-shift means connected into the signal path of one set of signals applied to said adding circuit and connected to said waveform generator and controlled by said waveform generator for varying the phases of said one set of signals, amplifying means for amplifying the output of said adding circuit, and phase-comparison means for comparing the phase of the resultant amplitude variation at the output of said amplifying means with the phase of a waveform derived from said waveform generator.

11. A radio phase-comparison receiver arranged to receive radio-frequency signals derived from an oscillator and signals of the same frequency from a second source respectively, said receiver comprising a first mixer for receiving one of said signals, a second mixer for receiving the other of said signals, phase-shift means connected to an input of said second mixer for imparting a cyclically varying phase-shift to signals passing through the phase-shift means, local oscillator means connected to said first mixer and to the input of said phase-shift means, a vectorial adder connected to the outputs of both said mixers for adding together vectorially the output signals from said mixers to produce a resultant amplitude varied signal, and phase-comparison means connected to said adder means for comparing the phase of the amplitude variation in said resultant signal with the timing of the phase-shifts produced by said phase-shift means.

12. A radio phase-comparison receiver as claimed in claim 11 wherein there is provided waveform generator means connected to said phase-shift means and to said phase-comparison means to control the timing thereof.

13. A radio phase-comparison receiver as claimed in claim 11 wherein there is provided means connected to said phase-comparison means and connected to control signals derived from said oscillator so that said signals are maintained in substantially constant phase relationship relative to signals from said second source.

References Cited

UNITED STATES PATENTS

| | | | |
|---|---|---|---|
| 2,987,675 | 6/1961 | Davis | 324—83 |
| 3,045,234 | 7/1962 | Sandretto | 343—112.3 |
| 3,147,441 | 9/1964 | Adler | 325—485 |

KATHLEEN H. CLAFFY, *Primary Examiner.*

A. H. GESS, *Assistant Examiner.*